United States Patent [19]

Dull et al.

[11] Patent Number: 5,693,346
[45] Date of Patent: Dec. 2, 1997

[54] AUTOMATIC MOLDED HARDBOARD UNNESTING SYSTEM

[75] Inventors: Charles Dull, Wysox; Leo Wills; Jerry Mott, both of Troy, all of Pa.

[73] Assignee: Masonite Corporation, Chicago, Ill.

[21] Appl. No.: 461,320

[22] Filed: Jun. 5, 1995

[51] Int. Cl.⁶ ............................................. B29C 43/50
[52] U.S. Cl. .................... 425/139; 425/338; 425/436 R; 425/422; 100/198
[58] Field of Search ............................... 100/198, 199; 425/436 R, 338, 139, 437, 422

[56] References Cited

U.S. PATENT DOCUMENTS

| | | | |
|---|---|---|---|
| 1,234,418 | 7/1917 | Thompson | 162/410 |
| 1,527,201 | 2/1925 | Louisot | 162/410 |
| 2,362,048 | 11/1944 | Cherry et al. | 249/66.1 |
| 3,379,322 | 4/1968 | Bruder et al. | 425/338 |
| 3,482,510 | 12/1969 | Fickler | 100/198 |
| 3,517,610 | 6/1970 | Siempelkamp | 100/198 |
| 3,810,730 | 5/1974 | Carlsson | 425/338 |
| 4,154,272 | 5/1979 | Huffman | 425/338 |
| 4,350,484 | 9/1982 | Seeger et al. | 425/338 |
| 4,375,948 | 3/1983 | von Holdt | 425/437 |
| 4,653,997 | 3/1987 | Sheffield et al. | 425/437 |
| 4,755,128 | 7/1988 | Alexander et al. | 425/292 |

Primary Examiner—James P. Mackey
Assistant Examiner—Iurie A. Schwartz
Attorney, Agent, or Firm—Marshall, O'Toole, Gerstein, Murray & Borun

[57] ABSTRACT

A system for unnesting a molded hardboard from a cavity die includes an air nozzle which directs a jet of air at a lower corner edge of the die. The air jet slightly lifts the board from the die to enable a loader tray to engage the edge of the board and push the board out of the die.

17 Claims, 4 Drawing Sheets

AUTOMATIC MOLDED HARDBOARD UNNESTING SYSTEM

BACKGROUND OF THE INVENTION

1. Field of the Invention

The invention relates generally to the molding of hardboard products in a cavity die and, more particularly, to a system for unnesting a molded board from a cavity die and removing the finished board from the die.

2. Description of Related Technology

Molded hardboard products are manufactured by pressing fiber mats between male and female cavity die sets. After the pressing operation, the finished boards must be broken loose and removed from the cavity die. This has typically been accomplished manually by an operator using a pry stick to unnest the board from the die. The operator must then hand-position the board so a loader can properly engage an edge of the board and push the board out of the die and onto an unloader. Manual unnesting of the board has several disadvantages. The operator is exposed to dangerously high die temperatures that may exceed 400° F. and is also at risk for injury if the die closes accidentally. Also, manual unnesting is slow because boards in multi-cavity presses must be unnested one at a time.

In an attempt to alleviate some of the problems associated with manual unnesting, cavity dies with air passages through the die have been used. Air streams are directed through the passages and are intended to lift the finished board from the die. However, the air passages frequently clog with fibers from the heating and pressing operations and are rendered ineffective. Further, the air streams often inconsistently and/or improperly position the board so the loader cannot engage an edge of the board to push the board out of the die. This causes jamming and considerably slows cycle times on the presses.

Therefore, there remains a need for a system which automatically unnests a molded board from a cavity die to allow a loader to properly engage the board and remove it from the die. Further, there remains a need for a system which allows simultaneous unnesting of the boards in a multi-opening press.

SUMMARY OF THE INVENTION

It is an object of the invention to overcome at least one of the problems described above.

According to the invention, a system for unnesting a molded board from a cavity die comprises an air nozzle directed at an edge of the cavity die to deliver a jet of air to lift an edge of the board from the mold, and means for engaging the board edge to remove the board from the die.

The invention also provides a method for unnesting a molded board from a cavity die comprising the steps of opening the cavity die, directing a jet of air at an edge of the cavity die to lift an edge of the board from the die, engaging the lifted edge of the board, and removing the board from the die.

Other objects and advantages of the invention may be apparent to those skilled in the art from the review of the following detailed description, including the drawings, and the appended claims.

DETAILED DESCRIPTION OF THE INVENTION

Figure 1:
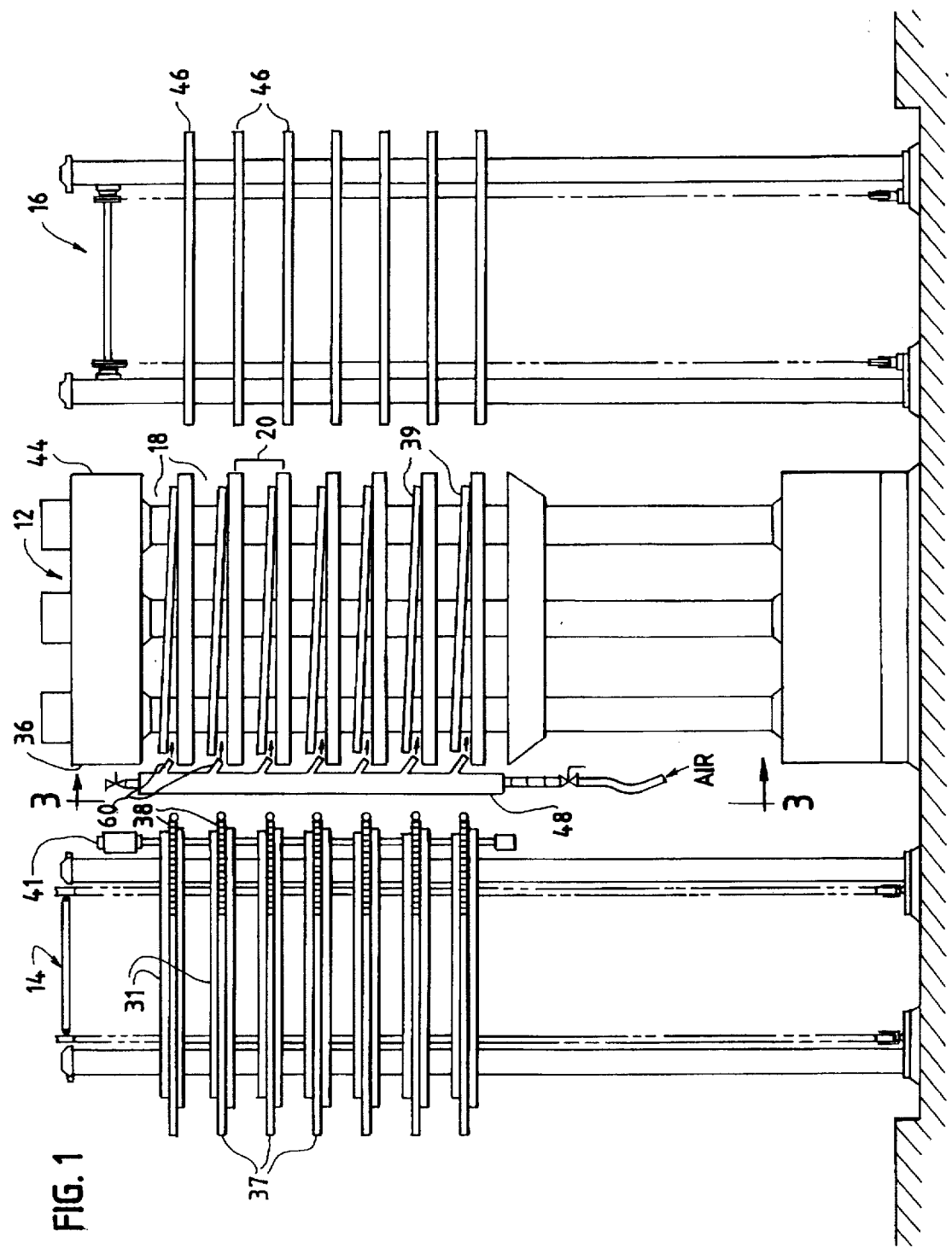
FIG. 1 is an elevational view of a multi-opening press incorporating the automatic molded hardboard unnesting system of the invention.
Figure 3:
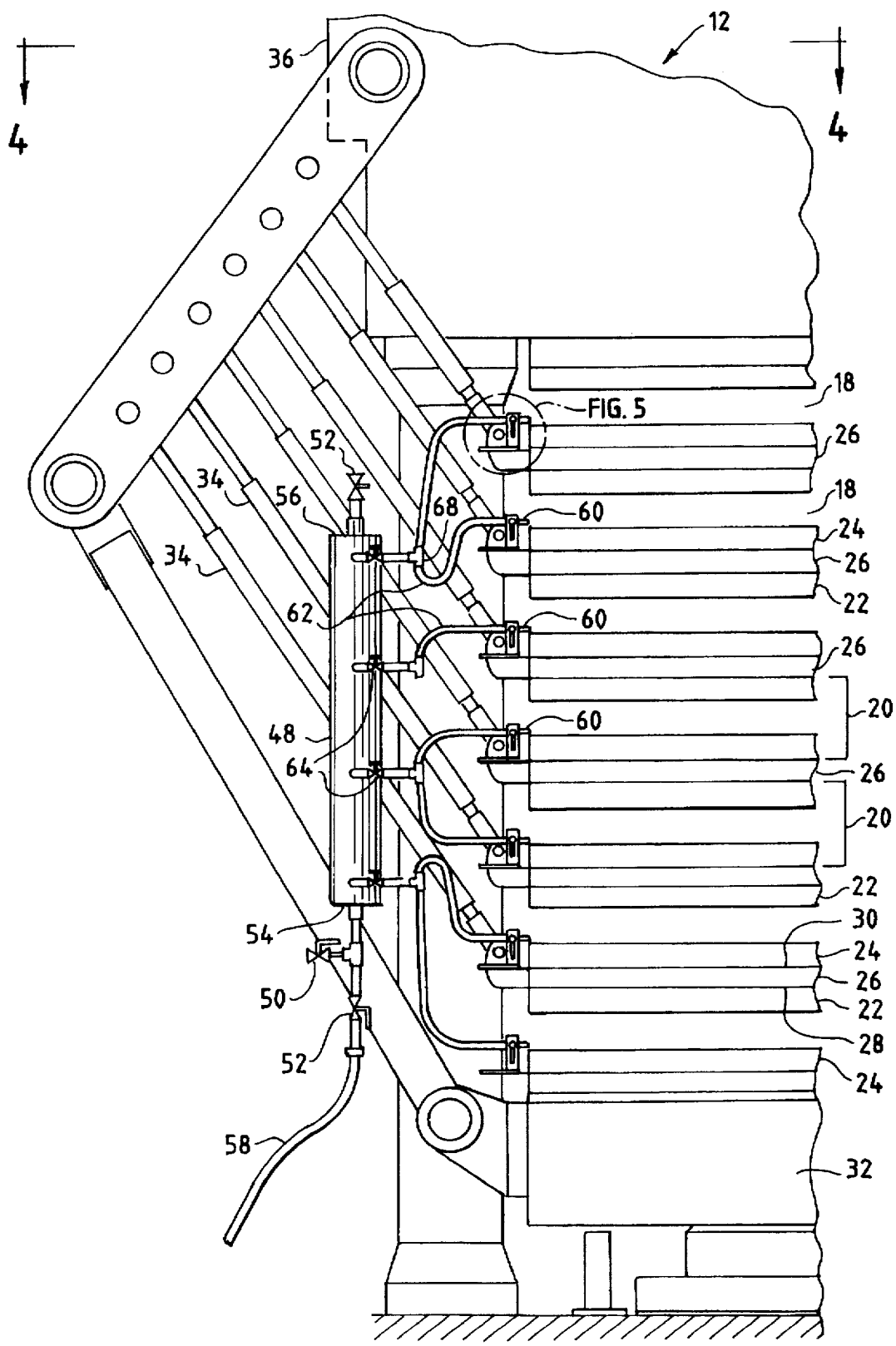
FIG. 3 is an enlarged cross-sectional view of the air header and air nozzles taken along the line 3—3 of FIG. 1.

Referring to FIGS. 1 and 3, a press 12 is positioned between a loader cage 14 and an unloader cage 16. The press 12 comprises a plurality of press openings 18 formed between cavity dies 20. Alternatively, the press 12 may comprise only a single cavity die 20 with a single press opening 18. In the multi-opening press 12, each cavity die 20 includes a male die portion 22 and a female die portion 24 mounted between platens 26. Each platen 26 has a lower side 28 and an upper side 30, wherein the male die portion 22 is mounted on the lower side 28 of the platen 26 and the female die portion 24 is mounted on the upper side 30 the platen 26.

In operation, fiber mats 31 are pressed between the male die portions 22 and the female die portions 24. A ram 32 raises the platens 26 to press the male die portions 22 and the female die portions 24 together, thereby closing the cavity dies 20. After pressing, the ram 32 lowers the platens 26 to open the cavity dies 20. Hydraulic arms 34 are used to stabilize the platens 26 to ensure simultaneous opening and closing of the cavity dies 20.

Figure 2:
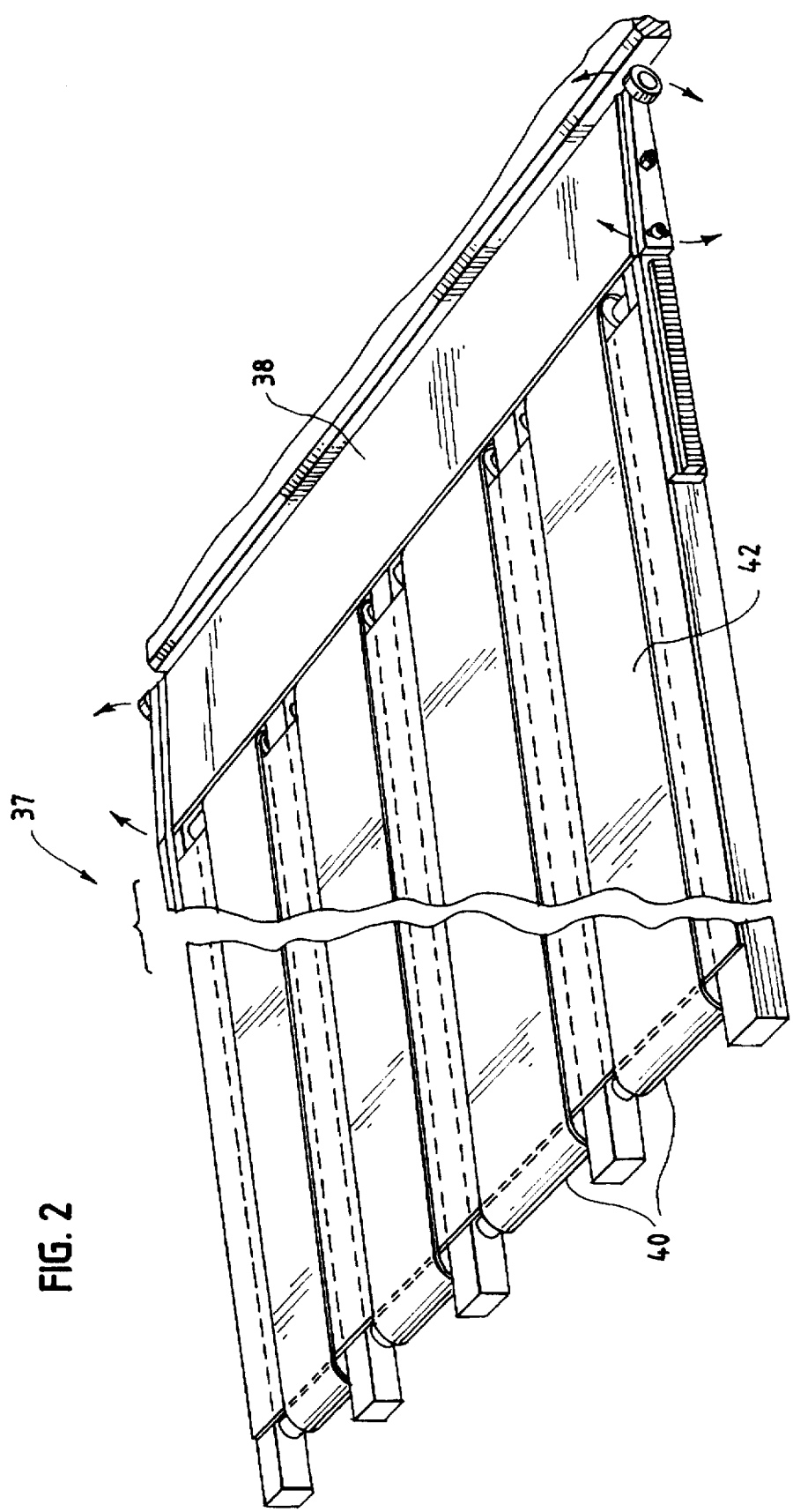
FIG. 2 is a perspective view of a loader tray used in connection with the multi-opening press of FIG. 1.

The loader cage 14, located on a first side 36 of the press 12, includes a plurality of loader trays 37. Referring also to FIG. 2, each loader tray 37 includes a loader nose piece 38 located immediately adjacent the press opening 18. The nose piece 38 is adapted to engage an edge of a finished board 39 in the cavity die 20 and push the board out of the cavity die 20. The nose piece 38 may be tapered to facilitate engagement of the board edge.

One or more conveyor belts 40 are located on a top side 42 of each loader tray 37. The conveyor belts 40 on the loader tray 37 are used to deposit a new fiber mat 31 into the cavity die 20 after the finished hardboard 39 has been removed.

Each loader tray 37 is designed to move horizontally across the loader cage 14 and into the press openings 18. The loader trays 37 are preferably moved by a loader tray drive 41 using a rack and pinion mechanism but alternatively may be moved by rollers, conveyers, or by any other suitable means. The loader tray 37 is considered to be in its "full back position" when the loader tray 37 is in the loader cage 14 immediately before the loader tray 37 begins to move towards the press opening 18.

The unloader cage 16 is located on a second side 44 of the press 12 opposite the loader cage 14. The unloader cage 16 comprises a plurality of unloader trays 46 located adjacent the press openings 18 to receive the finished hardboards 39 that are pushed out of the cavity dies 20 by the unloader tray nose pieces 38.

Figure 4:
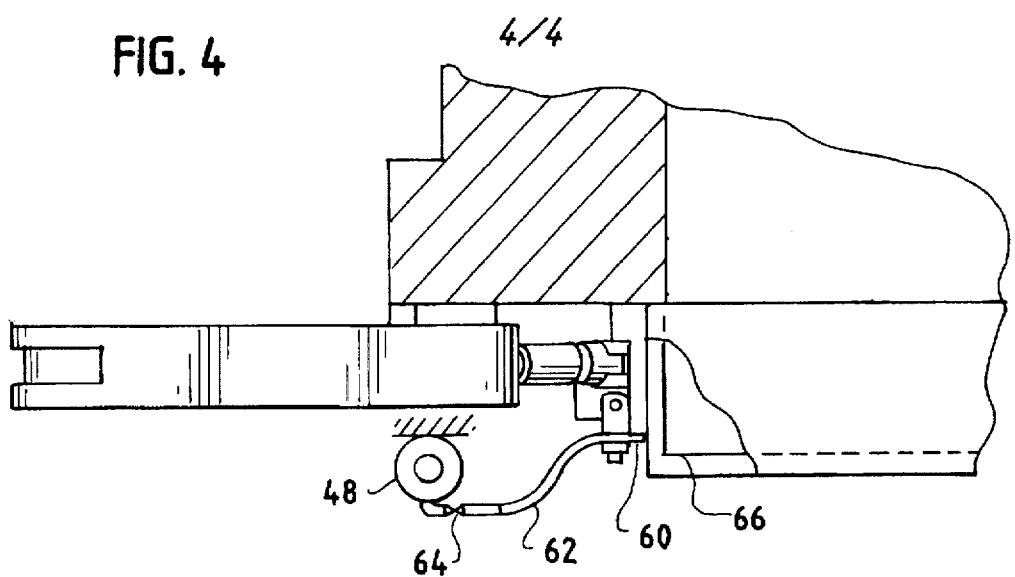
FIG. 4 is a partial plan view of the multi-opening press taken along the line 4—4 of FIG. 3.

Referring to FIGS. 3 and 4, the molded board unnesting system of the invention comprises an air header 48 connected to the first side 36 of the press 12. Preferably, the air header 48 is a 6" diameter vertical compressed air header and is equipped with a drain valve 50 and a pressure relief valve 52. The drain valve 50, which may be located on a bottom side 54 of the air header 48, may comprise a ¾"

diameter ball valve. The pressure relief valve 52 may comprise a ¾" diameter relief valve that may be located on either the bottom side 54, a top side 56, or both, of the air header 48. The header 48 is connected to an air source (not shown) via a flexible air line 58.

A plurality of air nozzles 60 are connected to the air header 48 via air tubes 62, which are illustratively ¾" diameter flexible copper tubes. Air flow from the header 48 to the nozzles 60 is controlled by solenoid valves 69 positioned inline with the air tubes 62 between the header 48 and the nozzles 60. One air nozzle 60 is positioned at a lower corner edge 66 of each cavity die 20 in the press 12. A single solenoid valve 64 may control the air flow through more than one air nozzle 60 by connecting the air nozzles 60 to the solenoid valve 64 by an air line tee 68, as illustrated in FIG. 3.

Figure 5:
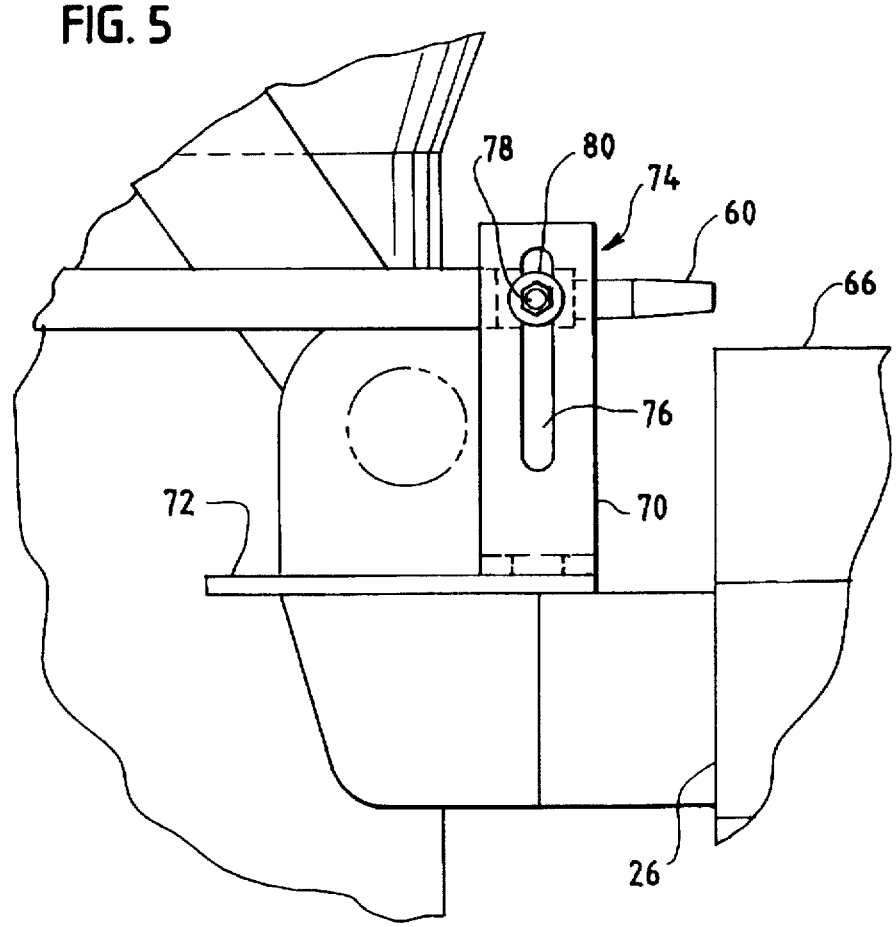
FIG. 5 is an enlarged view of the air nozzle of FIG. 3.

Referring also to FIG. 5, the air nozzles 60 are preferably mounted on the platens 26. Each air nozzle 60 is supported by a bracket 70 mounted on a support plate 72 which is connected to the platen 26 of the cavity die 20. The bracket 70 includes a nozzle height adjuster 74 which allows the nozzle 60 to be properly positioned such that a jet of air through the nozzle 60 is directed towards the lower corner edge 66 of the cavity die 20. The nozzle height adjuster 74 comprises a vertical slot 76 in the bracket 70. A bolt 78 is connected to the nozzle 60 and the bolt 78 is movably disposed in the vertical slot 76. A nut 80 secures the bolt 78 in the slot 76 when the nozzle 60 is properly directed at the lower corner edge 66 of the cavity die 20. Illustratively, the nozzle 60 may be ⅜" or ½" in diameter, depending on the air pressure and the size of the board.

Alternatively, the air nozzles 60 may be mounted in a standing pipe located close to the first side 36 of the press 12 rather than on the cavity die platens 26. Mounting the nozzles on a structure separate from the press 12 may be desirable when a large multi-cavity press (i.e. a fourteen opening press) is used to avoid any potential problems with tangling of air tubes 62.

For simplicity, operation of a press 12 with only a single cavity die 20 will be described. The unfinished fiber mat 31 is placed on the conveyer belts 40 on the top side 42 of the loader tray 37 and deposited into the cavity die 20. A finished hardboard product is molded by pressing the fiber mat between the male die portion 22 and the female die portion 24 of the cavity die 20.

After pressing is completed, the loader tray 37 leaves its full back position in the loader cage 14 and begins to move horizontally towards the press opening 18. When the loader tray 37 leaves its full back position, it triggers a switch (which may be located on the loader tray drive 41) to open the cavity die 20. Also, the solenoid valve 64 is triggered to deliver a jet of air from the air header 48 to the air nozzle 60. The air nozzle 60 directs the jet of air at the lower corner edge 66 of the cavity die 20. The jet of air slightly lifts the board from the cavity die 20. The nose piece 38 of the loader tray 37 then engages the edge of the board and pushes the board out of the cavity die 20. The loader tray 37 continues to move horizontally into the press opening 18 until the finished board is pushed onto the unloader tray 46. Alternatively, the unloader tray 46 could grasp the edge of the board 39 and pull the board out of cavity die 20.

The loader tray 37 then begins to move back towards the loader cage 14 and the conveyer belts 40 on the loader tray 37 are actuated in the opposite direction to place the new fiber mat inside of the cavity die 20 for pressing. Once the mat is deposited inside of the die 20 and the loader tray 37 is completely removed from the press opening, the switch is triggered to close the cavity die 20. A new fiber mat is placed on the loader tray 37 and the process repeats.

The air nozzle 60 is actuated by the solenoid valve 64 when the loader tray 37 leaves its full back position and is deactuated by a timer. The timer is incorporated into a central control system which monitors the overall operation of the press 12. Preferably, the air nozzle 60 is actuated until immediately before the loader tray nose piece 38 engages the edge of the board (approximately 1 to 1.5 seconds). In order to effectively lift the board slightly from the cavity die 20, air pressure through the nozzle is maintained between 80 and 110 psig.

According to the invention, the jet of air through the air nozzle 60 is used to only slightly lift or "flutter" the edge of the finished board from the cavity die 20 without completely unnesting the board from the die 20. Fluttering the edge of the board allows the loader tray nose piece 38 to properly engage the edge of the board to push the board out of the cavity die 20. This system is particularly suitable for use in multi-opening presses because it allows simultaneously unnesting of the boards in each cavity die 20.

The foregoing detailed description is given for clearness of understanding why, and no unnecessary limitations should be understood therefrom, as modifications within the scope of the invention may be apparent to those skilled in the art.

We claim:

1. A system for unnesting a molded board from a cavity die, comprising:

an air nozzle directed at an edge of the cavity die holding the molded board, wherein the nozzle delivers a jet of air to lift an edge of the board from the die; and means for engaging the edge of the board and removing the board from the die.

2. The system of claim 1, wherein the means for engaging the edge of the board and removing the board from the die comprise a loader tray.

3. The system of claim 2, further comprising a nose piece on the loader tray for engaging the edge of the board.

4. The system of claim 2, further comprising an unloader tray for receiving the board after the loader tray removes the board from the cavity die.

5. The system of claim 2, further comprising means for controlling the air flow through the nozzle.

6. The system of claim 5, wherein the means for controlling the air flow through the nozzle comprises a solenoid valve.

7. The system of claim 6, further comprising a loader cage adjacent to the cavity die for supporting the loader tray before the loader tray moves towards the cavity die to remove the board from the die.

8. The system of claim 7, further comprising a switch for actuating the solenoid valve to start the flow of air through the nozzle when the loader tray leaves the loader cage and begins to move towards the cavity die.

9. The system of claim 8, further comprising a timer to shut off the air flow through the nozzle.

10. The system of claim 1, further comprising a compressed air header for distributing air to the nozzle.

11. The system of claim 10, further comprising a flexible air line connecting the nozzle to the header.

12. The system of claim 1, wherein the cavity die comprises a male die portion and a female die portion.

13. The system of claim 12, wherein the male die portion is mounted on a lower side of a first platen and the female die portion is mounted on an upper side of a second platen, and wherein the second platen is located beneath the first platen.

14. The system of claim 13, wherein the air nozzle is mounted on the second platen.

15. The system of claim 14, wherein the air nozzle is mounted on a bracket attached to the second platen.

16. The system of claim 15, wherein the bracket includes means for adjusting the position of the air nozzle.

17. The system of claim 16, wherein the adjusting means comprises a bolt connected to the nozzle and the bolt is movably disposed in a vertical slot in the bracket.

* * * * *